3,261,813
ROOM TEMPERATURE CURING SYSTEM FOR URETHANE PREPOLYMERS UTILIZING BIS-CHLOROANILINE AND DIBUTYLTIN DILAURATE

Thomas Ramos, New York, N.Y., assignor to the United States of America as represented by the Secretary of the Navy
No Drawing. Filed Feb. 13, 1963, Ser. No. 258,357
6 Claims. (Cl. 260—77.5)

The invention described herein may be manufactured and used by or for the Government of the United States of America for governmental purposes without the payment of any royalties thereon or therefor.

This invention relates to the curing of liquid urethane prepolymers and particularly to the curing of isocyanate terminated, urethane prepolymers at room temperatures.

Up to the present time "urethane" polymers are usually prepared from a long chain diol such as a linear polyether or a low molecular weight "chain extender" (curing agent) such as a glycol or diamine, the glycol or diamine being an active hydrogen containing polyfunctional compound. While several reaction sequences may be used, the most successful to date is the "prepolymer" method. In the first step, the diol reacts with an excess of diisocyanate. The reaction product obtained is a moderate molecular weight liquid or low melting solid, and is called a "prepolymer." Terminating in isocyanate groups, it can undergo the usual isocyanate reactions.

In previous curing procedures for urethane prepolymers, the major disadvantages were in the mixing required to incorporate the curing agent in the prepolymer, which involved a temperature well above room temperatures, such as between 250 degrees to 258 degrees F., to which the liquid prepolymer was preheated. A solid aromatic diamine curing agent was then added to the preheated prepolymer, either as a powder or as a molten fluid. Such a molten fluid may be obtained by heating the solid aromatic diamine to a temperature ranging between 212 degrees to 221 degrees F. The solid or molten aromatic diamine curing agent is then added to and mixed with the preheated urethane prepolymer with stirring of the mixture. The compounded mix is then poured into a preheated mold and generally cured at about 285 degrees F. for about thirty minutes, and finally post cured for approximately four hours at about 212 degrees F.

Urethane prepolymers in liquid form may be prepared from the reaction of a long chain diol such as a linear polyester or polyether, with a diisocyanate and a low molecular weight chain extender such as a glycol or diamine. The reaction product so obtained is called a prepolymer which is terminated in either NCO or OH groups, depending upon which reactant is present in excess.

An object of this invention is to polymerize liquid urethane prepolymers at room temperatures within a desired brief time by new and simple procedures.

A further object of the invention is to provide an improved and simple method of curing liquid urethane prepolymers, which may be performed at room temperatures, with which no preheating of the prepolymers is required, with which no reduction of the curing agent to a powder or to a molten condition is necessary, desired or advantageous, which may be performed with the materials at room temperatures, which may be easily performed with simple and inexpensive apparatus and by non-technical personnel, and which may have additives added to give selected results.

Another object of the invention is to provide a new, improved and less expensive cured urethane prepolymer.

Other objects and advantages will appear from the following description of some examples illustrating the practice of the invention and the novel features will be particularly pointed out in connection with the appended claims.

The curing system of this invention employs the use, as a curing agent for liquid prepolymers of urethane, at room temperatures, of a mixture of an organotin compound and a solid aromatic curing agent 4,4'-methylene-bis(2-chloroaniline), the latter being marketed, for example, under the trade name "Moca."

One example of a liquid, isocyanate terminated, urethane prepolymer which may be cured at room temperature in this manner is available in the open market under the name "Adiprene L–100," which prepolymer is the reaction product of 2,4-tolylene diisocyanate and 1,4-butylene oxide polyglycol, having an isocyanate content in excess of from 4.0 to 4.3 percent by weight of isocyanate groups. This "Adiprene" is described, for example, in Development Products Report #10 of March 15, 1958, and in Report No. 13, dated October 1958, both published in printed form and distributed by Du Pont de Nemours & Company.

An illustrative or typical example of the curing of urethane prepolymers satisfactorily in accordance with this invention are:

Example I

| Component | Function | Parts by Weight |
|---|---|---|
| "Adiprene L–100" | Urethane Prepolymer. | 100. |
| Organotin and "Moca" [1] | Curing agent | 24 to 36 (30 gives excellent results). |

[1] A mixture of 1 part by weight dibutyltin dilaurate with 1 part by weight 4,4'-methylenebis(2 chloroaniline). Dibutyltin dilaurate (organotin compound) is manufactured, for example, by Metal and Thermit Corporation. It is only necessary to mix the components of prepolymer and the curing mixture both at room temperature and allow them to stand at room temperature until the prepolymer was cured.

Another example of a typical illustrative or representative mixture of curing agents that may be used in Example I is:

| Component: | Parts by weight |
|---|---|
| Dibutyltin dilaurate | 1.0 |
| "Moca" | 0.75 to 2.5 |

The use of organotin compounds alone as curing agents for urethane prepolymers has not given entirely satisfactory results unless heat is used to post cure them, because they are inadequate to cause curing at room temperatures within a reasonable time, such as within ten hours. However, when they are used in conjunction with the "Moca" (4,4'-methylenebis(2-chloroaniline)) the two act together to give curing at room temperatures well within a reasonable time. The "Moca" appears to promote and/or accelerate the rate of curing. By varying the concentration or proportion of the "Moca" in the curing mixture, the rate of reaction and speed of curing may be varied, an increase in the proportion of the "Moca" causing an increase in the rate of reaction and speed of curing. Since this new mixture cures at room temperatures within a reasonable time, much less than ten hours, the mixture can be used, diluted to any extent necessary or desired, as a paint or coating, with added pigments and fillers or flame retardant agents incorporated in the mixture to give the nature of the coating desired. Such a mixture will cure after application to a surface.

Because of variations in the batch properties of the various chemical components, compounds or materials, as obtained commercially and used in connection with this invention, all of the values, examples, statements, proportions, conditions, ratios and physical properties given hereinabove, must be considered as typical, representative, and illustrative and not necessarily optimum. Changes in the production techniques for the chemical compounds, chemical components or materials used or involved with this invention will, over a period of time, have considerable or cumulative effect on the product, end item or system, and hence, periodic reevaluations may be adviseable or desirable.

The foregoing are to illustrate that products, end items or systems according to my invention may or will vary somewhat in property characteristics, due to variations in the properties of various batches of commercially available chemical components, compounds, or materials used, over which I have no control, so that while any specific characterizing properties of the new product, end item or system as given in the specification are actually those obtained in illustrative, representative or typical examples, and that variations in the characterizing properties in the products, and items or systems made from different batches of materials, chemical components or compounds are unavoidable with presently commercially available materials, chemical components or compounds.

It will be understood that various changes in the details, conditions and materials which have been herein described in order to explain the nature of the invention, may be made by those skilled in the art within the principle and scope of the invention, as expressed in the appended claims.

I claim:
1. The method of preparing a cured urethane polymer which comprises
   mixing, at a temperature in the range of 60 to 80 degrees Farenheit,
      (a) an isocyanate terminated, liquid urethane prepolymer, with 4,4' - methylenebis(2 - chloroaniline) and dibutyltin dilaurate, and curing the mixture at room temperature.

2. The method according to claim 1, wherein the components are in the proportions of 100 parts by weight of said prepolymer to about 24–36 parts by weight of a mixture containing 1 part by weight of dibutyltin dilaurate and from 1 to about 1.5 parts by weight of the 4,4'-methylenebis(2-chloroaniline).

3. The method of preparing a cured urethane polymer which comprises
   mixing, at a temperature in the range of 60 to 80 degrees Farenheit,
      (a) that liquid prepolymer of urethane which corresponds to the reaction product of 2,4-tolylene diisocyanate and 1,4-butylene oxide polyglycol,
      (b) and having an isocyanate content in excess of from 4.0 to 4.3% by weight of isocyanate groups, with dibutyltin dilaurate and 4,4'-methylenebis(2-chloroaniline), and curing the mixture at room temperature.

4. The method according to claim 3, wherein the components are in the proportions of 100 parts by weight of said prepolymer, and about 24 to 36 parts by weight of approximately equal proportions by weight of dibutyltin dilaurate and the 4,4'-methylenebis(2-chloroaniline).

5. A urethane polymer comprising a cured mixture containing, before curing,
   (a) a liquid urethane prepolymer having terminal isocyanate groups in the polymer chain, dibutyltin dilaurate, and 4,4'-methylenebis(2-chloroaniline).

6. The urethane polymer according to claim 5, wherein the proportions of the components are approximately 100 parts by weight of the prepolymer, and 24 to 36 parts by weight of the dibutyltin dilaurate and said 4,4'-methylenebis(2-chloroaniline) together, where the latter two are in the proportions of from one part dibutyltin dilaurate to from 1 to 1.5 parts by weight of 4,4'-methylenebis-(2-chloroaniline).

References Cited by the Examiner
UNITED STATES PATENTS

| | | | |
|---|---|---|---|
| 2,917,489 | 12/1959 | Gladding | 260—77.5 |
| 3,073,802 | 1/1963 | Windemuth | 260—2.5 |
| 3,136,731 | 6/1964 | Piechota | 260—77.5 |
| 3,148,162 | 9/1964 | Gmitter | 260—77.5 |

OTHER REFERENCES

"Moca," A Diamine Curing Agent for Isocyanate Terminated Polymers, Du Pont Development Product Report #2, March 1, 1957.

Adiprene L, A Liquid Urethane Elastomer, Du Pont Development Product Report #10, March 15, 1958, at pages 2–7.

Adiprene L, A Liquid Urethane Elastomer, Du Pont Bulletin #7, October 1965, pages 4–10.

LEON J. BERCOVITZ, *Primary Examiner.*

M. C. JACOBS, *Assistant Examiner.*